July 25, 1939.  M. J. LIUHTO  2,167,244
IMPLEMENT FOR TOPPING OF BEETS
Filed Feb. 10, 1937
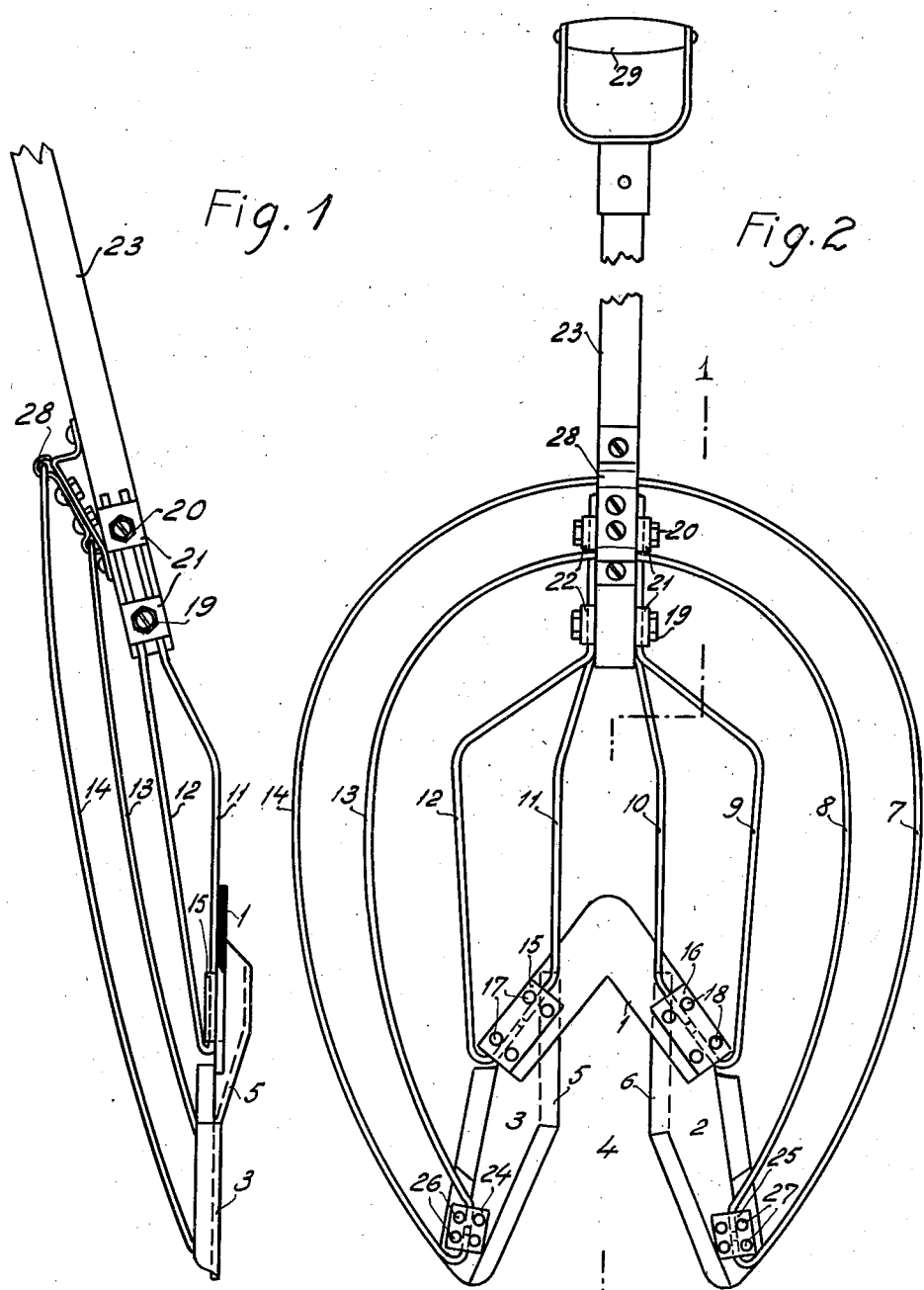
INVENTOR
MARTTI J. LIUHTO
BY
Richards & Geier
ATTORNEYS Patented July 25, 1939

2,167,244

UNITED STATES PATENT OFFICE 2,167,244

IMPLEMENT FOR TOPPING OF BEETS

Martti Johannes Liuhto, Kytaja, Finland

Application February 10, 1937, Serial No. 125,046
In Finland February 14, 1936

1 Claim. (Cl. 56—327)

The implements for topping of beets are principally either pure topping-machines or -implements or topping accessories combined with machines for topping on harvesting the beet.

The topping and harvesting machines for beets operate generally unsatisfactory and the same have not found any extensive use at farms except the very great beet farms, where the costs in regard to the quality are of no importance in regard to the quantity of the crop.

The topping implements are either heavy machines on wheels or of a light construction for hand work.

The light topping implements, to which also the object of this invention relates, are of many different constructions. The knives for topping the stalks are commonly not of a suitable form and some support for the stalks cut does not exist or is the same of a very imperfect construction. A special fault is that the topping implements do not have any steering or guiding means to steer the work and thus the workman must at his work exert a special skill and attention to his work, especially when the topping work is to be done at a definite height.

At the beet itself is of course not to be left any traces of the bitter stalks and if topped too low, the result is an economical loss.

The object of this invention relates to a spade-like implement for topping the beets, the most important parts of the said implement consisting of the sledges or rails steering and bearing the tool, arranged to the combination of the point—and cutting parts and of one, of steel wire,—net or plate made, spadeformed, low holder for stalks, joined to the former and provided with a stem with a handle.

In the accompanying drawing is shown a form of my invention, the

Figure 1 is a section taken along the line 1—1 of Figure 2.

Figure 2 is a top plan view of a detopping implement according to the invention.

The knife 1 of the topping implement is made of steel plate and is angleshaped.

The pointed mouthpieces 2, 3 are made in the best way of galvanized plate or steel wire. At the free ends of the mouthpieces the edges of the plates are bent upwards to resist the shocks at the work. At the rear parts of the mouthpieces the inner edges (of the plates) are bent downwards and laterally to form the bearing sledges 5 and 6 for the implement. The sledges 5 and 6 can also be made of plate-iron and firmly fastened or alternatively adjustable regarding the height of the operation. These sledges may be adjusted, if desired, simply by means of an ordinary screw or nut or similar arrangement.

The stalkholder is of a low net construction and consists of steel wires 7—14, in this case of 8 pieces, the number of which is variable as needed.

The knife 1 and the pointed mouthpieces 2, 3 are joined together through rivets. The bottom of the stalkholder consists of spokes 9—12 which spokes are fastened from their one end by the fastening plates 15—16 and the rivets 17—18 either to the knife 1 or to the mouthpieces 2, 3 or to them together. The spokes 9—12 are on their other ends joined to the shaft through the screws 19—20 and the washers 21—22.

The sidewalls of the stalkholder consist of the spokes 7, 8, 13, 14 and the fore ends of the same are fastened with the aid of the plates 24, 25 and rivets 26, 27 to the mouthpieces 2, 3. The rear bends of the spokes 7, 8, 13, 14 are joined to the shaft 23 by the joint piece 28. The shaft 23 is of wood and furnished with a handle 29 of known shape. The stalkholder can of course also be made of a very thin plate.

By the use of the implements for topping beets, the same is to be pushed along a single row of beets. By this operation the knife 1 cuts the stalks at the desired height and as soon as the holder is filled with stalks, the same can easily be emptied to the side in heaps. The topped beets are then harvested in known manner and transported further.

Having thus fully described my said invention, what I claim as new and useful, is:

A beet-topping implement comprising in combination, two plates having diverging front edges and constituting a forked front having a flared front portion for guiding the tops, a V-shaped cutter mounted upon said plates and situated behind the flared front portion to cut the tops guided by the flared front portion, runners connected with said plates to guide the implement on the ground and maintain said cutter at the proper cutting level, a handle situated behind said cutter, a plurality of wires situated at different levels to form a reticulated scoop structure and having front portions and rear portions, means connecting the front portions of said wires with said plates, and means connecting the rear portions of said wires with said handle.

MARTTI JOHANNES LIUHTO.